J. P. OLP.
POKE.

No. 172,823.　　　　　　　　Patented Feb. 1, 1876.

Witnesses.　　　　　　　　Inventor:
Frank Kingsley　　　　　　Joseph P. Olp
Peter R. Brothers　　　　　pr B. F. Parsons atty

UNITED STATES PATENT OFFICE.

JOSEPH P. OLP, OF MOUNT MORRIS, NEW YORK.

IMPROVEMENT IN POKES.

Specification forming part of Letters Patent No. 172,823, dated February 1, 1876; application filed November 18, 1875.

*To all whom it may concern:*

Be it known that I, JOSEPH P. OLP, of the town of Mount Morris, in the county of Livingston and State of New York, have invented a certain new and useful Improvement in Animal-Pokes; and I do hereby declare the following to be a full, clear, and exact description of the construction and operation of the same, sufficient to enable those skilled in the art to which it appertains to construct and make use of the invention, reference being had to the drawings accompanying this specification, and to the figures and letters of reference marked thereon, in which like letters refer to like parts throughout the same, and on which—

Figure 1:
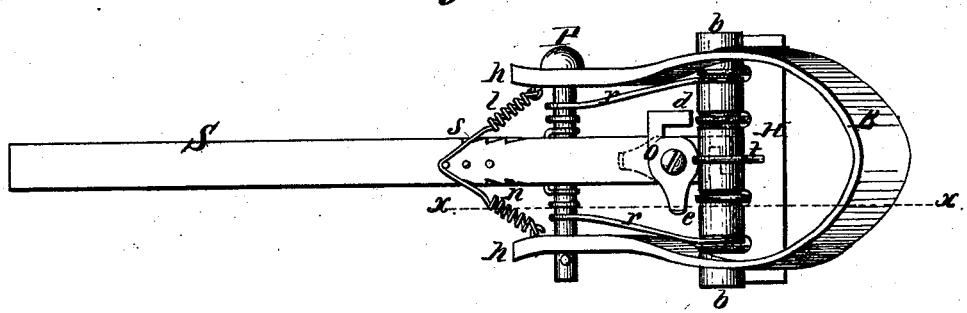
Figure 2:
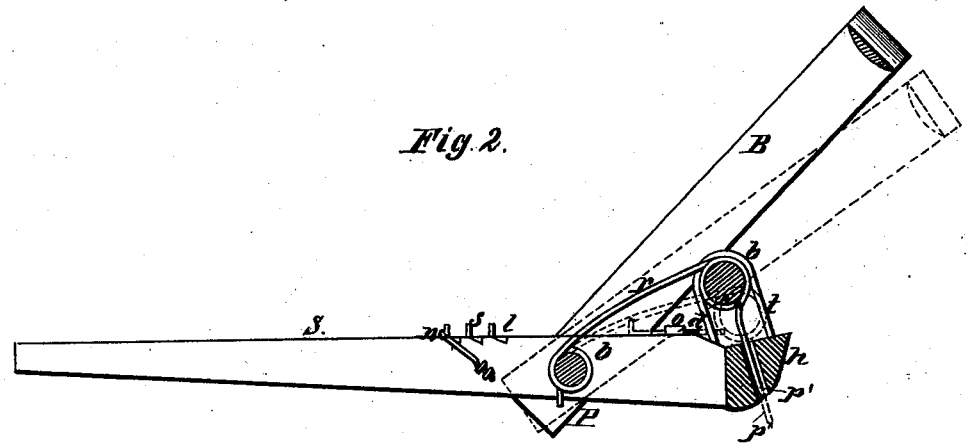

Figure 1 represents the top of the invention. Fig. 2 represents a vertical section of the invention on a line $x\ x$.

My invention relates to animal-pokes.

It frequently occurs that restive and persistent animals, when accustomed to the poke, learn by raising the head to first throw the stale over the fence, when, by a spring, they land in an adjoining inclosure, and to the manager the ordinary poke for that animal becomes a worthless article.

But others are submissive, yielding readily to the goadings of the prod, and the manager, to ascertain whether the animal is broken of its fault, wishes to discontinue the punishment for a time, without removing the poke from the animal's neck; and the object of my improvement is to remove this defect, to supply this want.

It consists, first, in a rubber or coil loop, having its ends, after passing over its stale, attached by hooks to the inside ends of the bow, and on top of the stale stub and notch detainers for adjusting the torsion of the loop and controlling the rigidity of the poke.

Second, in a slotted disk-lock attached, by screws or equivalent, to the rear end of the stale, which slot, as it swings under the spring or roller bar, receives into it the front leg of the staple, which holds the bar in place; in said staple is a detent for said bar, and also in the wire forming the springs, extended to also form the prod-points, so as to make the spurs and springs out of one continuous piece of wire.

In the drawing, S represents the stale, permanently attached by mortise and tenon to the head-piece H.

The bow-pin P passes through, at the same time, the ends of the bow B and the stock of the stale, while the wire in one piece, forming the springs $r$ and spurs $p$, bestrides from the under side the stale at the bow-pin, having at the same time each of its ends coiling twice round the bow-pin, thence passing to the spring-bar $b$, and, after coiling twice around that also, passing through the perforations $p'$ in the head-block H, and forming the prod-points $p$, thus making in and out of the same piece of wire, as above, the springs $r$ and the two points $p$.

If desired, more spurs may be made by first coiling wire in a similar manner around the spring-bar $b$, and then passing their ends through other perforations in said head-block.

The staple $t$, closing over the spring-bar $b$, is attached to the head-piece, holding in place the springs $r$, and retaining at the same time fully within said head-piece the spur-points $p$ until protruded by the workings of the bow impinging on the bar.

As the slotted metal disk $d$ is turned by its rear end round lengthwise of the stale, the slot $o$ in its opposite end, in passing under the spring-bar $b$, is brought crosswise of the stale, receiving into the slot $o$ at the same time the front leg of the staple; and there being enough of the disk left to form a lock outside, rearward of the slot, for locking the spring-bar $b$, the bar by this means is prevented from moving toward the head-block, protruding the prods; and as also the staple prevents the bar from rising, and the lock prevents it from going toward the head-block by tightening the screw $e$, the bar is held stationary, fully withholding and secreting within the head-block the prod-points $p$, until, by slackening said screw, and turning the lock back crosswise of the stale, the bar is released, and the spurs again take effect by the movements of the bow.

The object of locking the spring-bar controlling the spurs is to test from time to time the efficiency of the prods to subdue the propensity, and to cure the animal of his fault, without removing the poke, and to leave on him an impression, by the presence of the poke, that the spurs are also present, without subjecting him to their punishment.

On the inside of the bow, near its ends, are metal hooks $h$, to which, after passing over the stale, are attached the ends of a coil or rubber loop, $l$, the object of which loop is to give rigidity to the poke as a whole, and to limit the easy movement of the stale, thereby preventing the animal, before leaping a fence, from first, by raising the head, throwing over the same.

For obtaining the desired rigidity by means of said loop $l$, the detent-stubs $s$ and notches $n$ allow of any degree of torsion in the loop desired for that purpose.

Having now fully described my improvements in animal-pokes, what I claim as my invention, and for which I pray that Letters Patent may be granted unto me, is—

An improved animal-poke, consisting of the stale S, joined to the head H, the bow-pin P, connecting the bow B to the stale, the springs $r$, of a single piece of wire, whose ends form the prods $p$, the disk-lock $d$, secured by the screw $e$, and provided with the slot $o$, the staple $t$, partially encircling the bar $b$, and attached to the head H, and the loop $l$, connected to the bow by the hooks $h$, and acting in conjunction with the stubs $s$ and notches $n$, all arranged as and operating in the manner substantially as set forth.

In testimony whereof I have hereto set my hand this 13th day of November, 1875.

JOSEPH P. OLP.

Witnesses:
FRANK KINGSLEY,
A. C. PARSONS.